US006651760B2

(12) United States Patent
Cox et al.

(10) Patent No.: US 6,651,760 B2
(45) Date of Patent: Nov. 25, 2003

(54) THERMIONIC AUTOMOBILE

(75) Inventors: Isaiah Watas Cox, London (GB); John Eric Reaves, Marrietta, GA (US)

(73) Assignee: Borealis Technical Limited (GI)

(*) Notice: Subject to any disclaimer, the term of this patent is extended or adjusted under 35 U.S.C. 154(b) by 1 day.

(21) Appl. No.: 09/828,646

(22) Filed: Apr. 5, 2001

(65) Prior Publication Data

US 2001/0045309 A1 Nov. 29, 2001

Related U.S. Application Data

(60) Provisional application No. 60/194,850, filed on Apr. 5, 2000.

(51) Int. Cl.[7] ............................................... B60K 25/00
(52) U.S. Cl. ...................................... 180/65.3; 180/309
(58) Field of Search .............................. 180/65.3, 65.2, 180/65.1, 65.4, 309

(56) References Cited

U.S. PATENT DOCUMENTS

| | | | | |
|---|---|---|---|---|
| 3,992,885 A | * | 11/1976 | Forster | .................. 60/698 |
| 4,097,752 A | * | 6/1978 | Wulf et al. | .................. 290/20 |
| 4,148,192 A | * | 4/1979 | Cummings | .................. 60/716 |
| 4,199,713 A | | 4/1980 | Forster | |
| 5,323,737 A | * | 6/1994 | Farrell | .................. 123/18 A |
| 5,625,245 A | * | 4/1997 | Bass | .................. 310/306 |
| 5,699,772 A | * | 12/1997 | Yonekawa et al. | .................. 123/497 |
| 6,054,837 A | | 4/2000 | Edelson | |
| 6,166,317 A | * | 12/2000 | Volk, Jr. | .................. 136/201 |
| 6,175,217 B1 | * | 1/2001 | Da Ponte et al. | .................. 322/19 |
| 6,192,687 B1 | * | 2/2001 | Pinkerton et al. | .................. 60/646 |
| 6,229,083 B1 | * | 5/2001 | Edelson | .................. 136/201 |
| 6,272,873 B1 | * | 8/2001 | Bass | .................. 62/238.3 |

FOREIGN PATENT DOCUMENTS

JP      10-238406      *   9/1998

* cited by examiner

Primary Examiner—Avraham Lerner

(57) ABSTRACT

A combustion chamber-thermionic device-electric motor is provided in an automobile. The combustion chamber of the present invention provides a heat output which is transformed to electricity by the thermionic device and a motor converts the electrical energy to motive power for the wheels.

36 Claims, 1 Drawing Sheet

THERMIONIC AUTOMOBILE

This application claims the benefit of provisional application Ser. No. 60/194,850 filed Apr. 5, 2000.

TECHNICAL FIELD OF THE INVENTION

This invention relates to thermionic drive means for automobiles.

BACKGROUND OF THE INVENTION

Thermionic devices, such as thermionic converters, which transform input heat to electricity, are known in the art. A number of thermionic converters comprise low work function electrodes that convert heat energy to electrical energy with enhanced efficiency. Thermotunneling converters are also known to the art.

The internal combustion engines used in automobiles convert the expansive energy of combusted fuel into pressure and the pressure into motive power for the vehicle. This process has a number of inefficiencies. For example, it is an inefficient use of fuel, as a substantial amount of heat liberated from the fuel is wasted. Furthermore, these engines work by driving pistons up and down. This not only leads to frictional losses, but also creates unwanted vibration: many designs are expressly created to disguise these vibrations. The internal combustion engine is also noisy, and this is especially so in large vehicles such as trucks and locomotives. Moreover, the frictional forces between the components of the internal combustion engine cause considerable wear and tear on the engine, and shorten the lifetime of the vehicle and of its component parts. Further, motors have to be large in internal combustion driven vehicles, which is a detriment, making motorcycles and mopeds bulky, and large trucks heavier than necessary.

Additionally, when a car is temporarily stopped, idling of the engine wastes energy, is inefficient and noisy, but is necessitated by the nature of internal combustion engine-driven cars.

U.S. Pat. No. 4,199,713 to Foster discloses an installation for supplying the electric power supply of motor vehicles which includes a generator, a battery as storage device or accumulator and several loads. a thermionic converter of conventional construction which is operable with the fuel of the motor vehicle is provided as generator. Foster does not teach the combination of thermionic converter and electric motor.

Internal combustion engines use the expansive forces of combusted fuel to provide motive power. This requires specific fuels. These fuels may be costly, and may be damaging to the environment. Further, many components of vehicles are mechanical, such as power steering, water pumping and fans.

SUMMARY OF THE INVENTION

From the foregoing, it may be appreciated that a need has arisen for a new engine for powering automobiles and the like. Briefly, in accordance with the present invention, an approach is provided to accomplish this result by combining a combustion chamber, a thermionic converter and an electric motor.

In one embodiment of the present invention, an engine comprises: a combustion chamber that burns fuel and produces heat energy; a thermionic device that converts said heat energy into electrical energy; and an electric motor.

In another embodiment of the present invention, an automobile comprises: a combustion chamber that burns fuel and produces heat energy; a thermionic device that converts said heat energy into electrical energy; and an electric motor, wherein said motor converts said electrical energy into rotational energy, wherein said rotational energy provides motive power to said automobile.

In another embodiment of the present invention, an improved system is disclosed which uses thermionic devices to convert combustion heat into electrical power that would in turn power an electric motor, providing a drive means for an electric car.

A technical advantage of the present invention is an energy efficient, environmentally friendly engine.

Another technical advantage of the present invention is an energy efficient, environmental friendly automobile. An additional technical advantage of the present invention is that unwanted vibrations due to mechanical movement of parts, such as the reciprocating movement of pistons, is reduced.

A further technical advantage of the present invention is that the engine does not need to idle when output power is not required.

A further technical advantage of the present invention is that the vehicle of the present invention can go from stopped to full speed without the need for elaborate restarting or for an idle state which consumes power. Additionally, the driver of the vehicle of the present invention is free to concentrate upon his surroundings without worrying about stalling his or her vehicle.

A still further technical advantage of the present invention is that vehicle systems that have been mechanical, such as power steering, water pumps and fans are unnecessary under the present invention because the thermotunneling converters replace the alternator, gaining still more efficiency.

An additional technical advantage of the present invention is that the heat energy of combusted fuel provides the motive power, allowing cheaper, healthier, and more easily obtainable fuels.

Other technical advantages of the present invention are set forth in or will be apparent from drawings and the description of the invention that follows, or may be learned from the practice of the invention.

BRIEF DESCRIPTION OF THE DRAWINGS

For a more complete explanation of the present invention and the technical advantages thereof, reference is now made to the following description and the accompanying drawing in which.

DETAILED DESCRIPTION OF THE INVENTION

Figure 1:
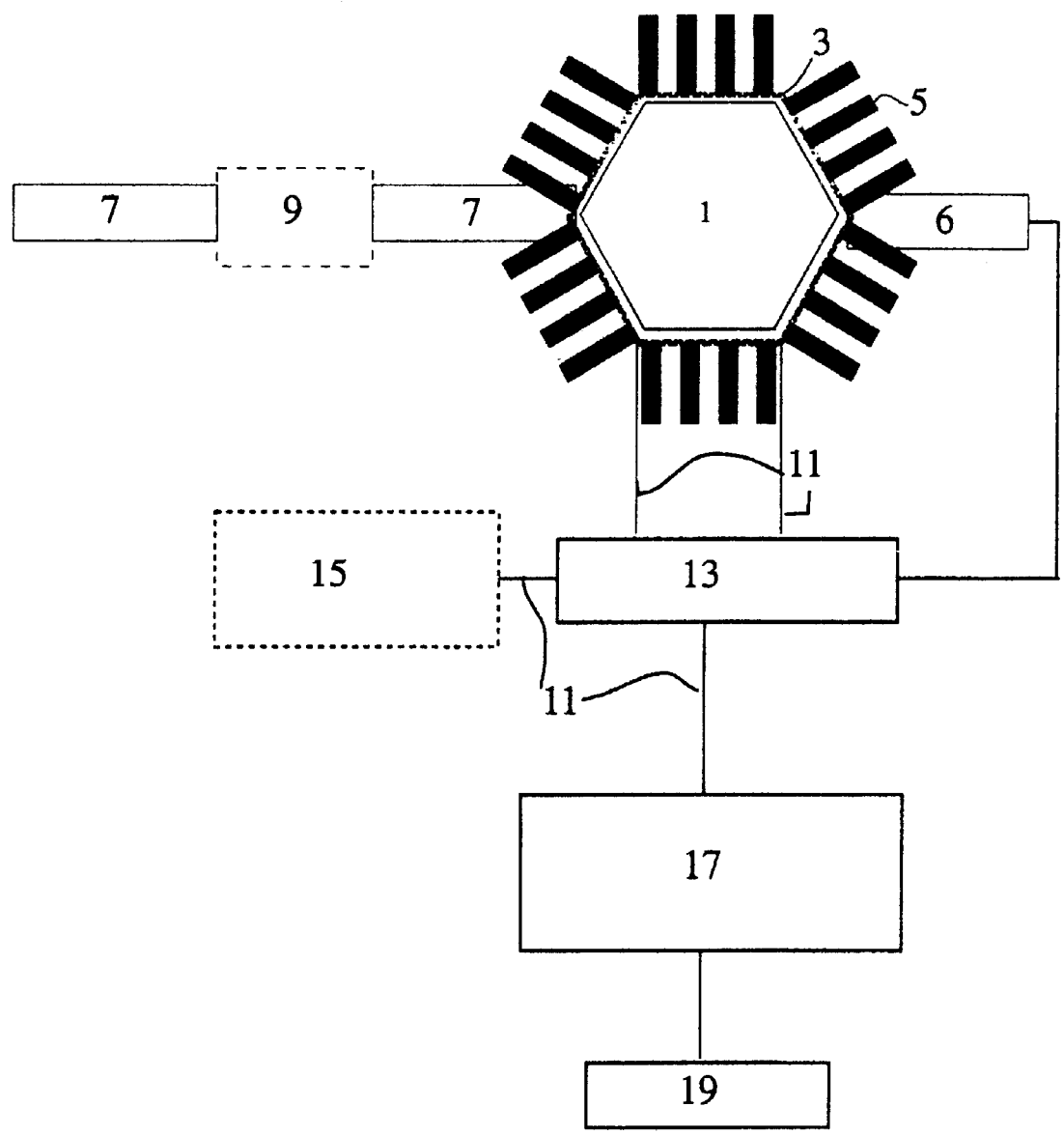
FIG. 1 shows an overview of the present invention.

Embodiments of the present invention and their technical advantages may be better understood by referring to FIG. 1.

For purposes of illustration, the present invention is discussed with reference to standard thermotunneling converters. However, it is understood that the present invention may be used in conjunction with any thermionic device that acts to convert input heat energy to output electrical energy. Furthermore, for purposes of illustration, the present invention is discussed with reference to vehicles, automobiles, and cars. However it is understood that many devices that use the combustion of a fuel in an engine to output motive power, may be reconfigured according to the present invention.

An engine may have an input of energy and two outputs. Traditionally, more energy is involved in heating than in pressure, resulting in substantially more energy being wasted than is used, because it is the pressure from the engine that causes the rotation of the wheels.

In accordance with the present invention, a combustion chamber is attached to themotunneling devices. As opposed to previous described usage of thermionic devices located close to exhaust heat, in the present invention such devices are located right next to the combustion chamber or combustion pipe, for drawing heat therefrom. They provide electrical power to a motor or plurality of motors for producing motive power therefrom.

In accordance with FIG. 1, a system comprising a combustion chamber, thermotunneling converters, and drive means for converting electrical output of the thermotunneling converters into motive power for the wheels of a vehicle is shown. A combustion chamber 1 is provided and surrounded by themotunneling converters 3. These are not limited in number, and may comprise a single device adapted to surround the combustion chamber, or a multiple of themotunneling converters 3 strategically placed around the chamber 1 for extracting as much heat therefrom as possible. Themotunneling converters generate electricity from a temperature differential, and therefore require a hotter side and a colder side. In the present invention, the hot side of the thermotunneling converter is placed adjacent the combustion chamber 1 while the colder side is adjacent to heat sink 5. Again, the heat sink 5 may be a single device connected to all the themotunneling converters 3, or a multiple of heat sink devices, or simply a cooling fluid.

To one side of the combustion chamber 1 is the fuel and air intake 6, which may comprise separate intake pathways, or a combined pathway, and could comprise means for compressing the fuel and/or the air. Glow plugs or similar means for beginning the combustion are not shown. The main exit for the combusted fuel from the combustion chamber 1 is through the exhaust 7. Along the pathway of the exhaust 7 is positioned a catalytic converter 9, which provides for the catalytic conversion of nitrates from the exhaust fumes. However, other catalytic converters may not be necessary in the present invention because a lean burn environment may be provided for according to the method of the present invention, thus not creating hydrocarbons or similar emissions. Optionally, along the pathway of the exhaust 7 are secondary thermionic converters for converting the remaining heat in the exhaust 7 into electricity.

The electrical output of the themotunneling converters 3 is transferred via electrical leads 11 to an energy control system 13. The themotunneling converters 3 may be arranged in series or in parallel to one another, however a preferred mode is in series because the drive 17 is likely to require a high voltage. The electrical control system 13 takes an input from a human controller, and computes and controls the air and fuel intake to the combustion chamber accordingly. It also takes an input from the energy storage system 15, and from the drive state, for the above computation. The energy control system 13 further allocates power to and from the energy storage system 15 as well as to the drive 17. The energy storage system 15 could comprise a battery, a flywheel, or the like.

The drive 17 comprises an electrical motor and a controller therefor. It may be any type of electrical motor, but a preferred type is one with many phases of electrical power (more than three phases), preferably with a different phase for each winding. The controller provides variable speed for the motor, and optionally provides for variable voltage too. The motor provides motive power to the wheels 19, according to the output of the controller.

The present invention also allows for several other features. For example, the present invention allows for vehicle air conditioning to be easily accommodated because the vehicle is operated on electrical power. In fact, the thermionic converters can completely replace the alternator used in the prior art. Extra control features over the drive and the wheels are also provided for with the present invention. Furthermore, generation of supplementary electricity when the vehicle is going downhill may be more easily converted to other useful electrical energy.

Some systems in a vehicle may not be converted to electrical energy. This energy, however, could be used elsewhere. For example, heat spare caused by the thermal output of the thermionic converters may be used to heat water, act as a coolant or a pump. Alternatively, secondary thermionic converters could be situated to receive the output heat from the primary ones, and produce supplementary electrical power.

A preferred embodiment of the present invention includes the use of high temperature (such as in the 2000 Kelvin range) high efficiency thermotunneling converters. The base of the vehicle may act as the heat sink. Alternatively, the top of the sides of the vehicle could also act as the heat sink. Further, the vehicle may be designed to be shielded from the sun but allow passing wind to remove heat therefrom. Another embodiment of the present invention may allow the thermotunneling converter to operate with high enough efficiency to not require a dedicated heat sink.

The thermotunneling converters of the present invention may be solid state, comprising glass between the electrodes, and with all its component parts able to operate at high temperatures.

The thermotunneling converters may power a motor of a car, although it could be used for other uses too. A preferred motor to be used in conjunction with a thermotunneling converter is a multi-phased motor, having more than three phases, which is able to utilize more harmonics of the input power than a three phase motor is able to, such as in U.S. Pat. No. 6,054,837 to Edelson, incorporated herein by reference in its entirety. Moreover, the present invention may be used with any type of motor.

The fuel in the combustion chamber, or pipe, may be introduced under high pressure to increase the efficiency of the fuel power. The pumping to perform this may come from electricity provided by the thermotunneling converters.

To maximize the heat output of combustion, a lean burn environment is allowed for. The present invention provides for hydrocarbons and carbon oxides to be fully combusted. A catalytic converter may be placed downstream of the combustion chamber to deal with the resultant nitrogen oxides.

A preferred embodiment of the present invention is in a car. However, the invention would be used in a golf cart, airplane, train, spacecraft, other vehicles, or other things commonly powered by engines.

The present invention further includes an energy storage medium for excess energy produced. This helps the vehicle at startup, for overload, to power secondary electrical devices in the vehicle, and the like. Such energy storage devices may include, but are not limited to, batteries, flywheels, and fuel cells.

Further, the present invention uses clean fuels, which produce little or no toxic fumes and byproducts.

Alternatively, even vegetable oils may be used to provide the required heat and driving power. All types of fuels or other technologies that provide heat in a similar way to fuel may be used. In a preferred embodiment, the fuel is injected into the combustion chamber, and initial glow plug or starter plug power would be provided from a storage medium.

Additionally, the present invention may use photoelectric generators to convert energy from the sun into electrical energy. Photoelectric generators comprise two electrodes, one exposed to the sun, and the other more shaded, each having a low work function. With an appropriate vacuum, the photoelectric converter may convert sunlight (and potentially some heat also), directly into electrical power. This can be used as a supplementary source of electrical power for the vehicle and is particularly useful in an all-electrically powered vehicle. Alternatively, the photoelectric generators may be situated above the thermotunneling converters to provide power to cool the heat sink side of the thermotunneling converters, thereby increasing the efficiency of the thermotunneling converters. This would be particularly useful when the air temperature is hot-when the photoelectric generators provide the most power.

Though the invention has been described with reference to specific preferred embodiments thereof, many variations and modifications will immediately become apparent to those skilled in the art. In particular, any device that exchanges heat for electrical power may replace thermionic converters. Furthermore, the combustion chamber may be replaced with any other source of heat energy such as a chemical reactor. Also, the invention describes an end result of providing motive power to wheels; however, it may also be used to provide motive power to other elements, such as a conveyer belt.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

We claim:

1. An engine comprising:
   a combustion chamber, in which fuel is combusted to release heat;
   a thermionic converter, which converts said heat into electrical energy;
   an electric motor powered by said electrical energy;
   an energy storage system; and
   an energy controller;
   wherein said controller takes an input from a throttle controlled by a human operator; an input representative of a load on said electric motor; an input representative of the amount of energy stored in said energy storage system; and computes and controls the intake of fuel and air into said combustion chamber.

2. The engine of claim 1 wherein said thermionic converter is a thermotunneling converter.

3. The engine of claim 1 wherein said thermionic converter comprises low work function electrodes.

4. The engine of claim 1 wherein said electric motor is a multi-phase electric motor.

5. The engine of claim 1 additionally comprising a heat sink, wherein said heat sink is attached to a cold side of said thermionic converter.

6. The engine of claim 1 additionally comprising a fuel intake, wherein said fuel intake is attached to said combustion chamber.

7. The engine of claim 6 wherein said fuel intake comprises a compressor for compressing said fuel prior to its introduction to said combustion chamber.

8. The engine of claim 1 additionally comprising an air intake, wherein said air intake is attached to said combustion chamber.

9. The engine of claim 8 wherein said air intake comprises a compressor for compressing said air prior to its introduction to said combustion chamber.

10. The engine of claim 1 additionally comprising an energy storage system, wherein electrical energy produced by said thermionic converter may be stored.

11. The engine of claim 10 wherein said energy storage system is an electrical battery.

12. The engine of claim 10 wherein said energy storage system is a flywheel.

13. The engine of claim 10 wherein said energy storage system is a fuel cell.

14. The engine of claim 1 wherein part of said electrical energy is used to power ancillary devices.

15. An automobile comprising the engine of claim 1 wherein said motor converts said electrical energy into rotational energy, wherein said rotational energy provides motive power to said automobile.

16. The automobile of claim 15 wherein said thermionic converter is a thermotunneling converter.

17. The automobile of claim 15 wherein said thermionic converter comprises low work function electrodes.

18. The automobile of claim 15 wherein said electric motor is a multi-phase electric motor.

19. The automobile of claim 15 additionally comprising a heat sink, wherein said heat sink is attached to a cold side of said thermionic converter.

20. The automobile of claim 15 additionally comprising a fuel intake, wherein said fuel intake is attached to said combustion chamber.

21. The automobile of claim 20 wherein said fuel intake comprises a compressor for compressing said fuel prior to its introduction to said combustion chamber.

22. The automobile of claim 15 additionally comprising an air intake, wherein said air intake is attached to said combustion chamber.

23. The automobile of claim 22 wherein said air intake comprises a compressor for compressing said air prior to its introduction to said combustion chamber.

24. The automobile of claim 15 additionally comprising an energy storage system, wherein electrical energy produced by said thermionic converter may be stored.

25. The automobile of claim 24 wherein said energy storage system is an electrical battery.

26. The automobile of claim 24 wherein said energy storage system is a flywheel.

27. The automobile of claim 24 wherein said energy storage system is a fuel cell.

28. The automobile of claim 15 additionally comprising an energy recovery system, whereby electrical energy is recovered when said automobile is undergoing braking.

29. The automobile of claim 28 wherein said energy storage system is an electrical battery.

30. The automobile of claim 28 wherein said energy storage system is a flywheel.

31. The automobile of claim 28 wherein said energy storage system is a fuel cell.

32. The automobile of claim 15 additionally comprising an energy recovery system, whereby electrical energy is recovered when said automobile is traveling down an incline.

33. The automobile of claim 32 wherein said energy storage system is an electrical battery.

34. The automobile of claim 32 wherein said energy storage system is a flywheel.

35. The automobile of claim 32 wherein said energy storage system is a fuel cell.

36. The automobile of claim 15 wherein part of said electrical energy is used to power ancillary devices.

* * * * *